(No Model.) 2 Sheets—Sheet 1.
R. O. CONANT & H. R. STICKNEY.
MACHINE FOR SILKING CORN.
No. 389,442. Patented Sept. 11, 1888.
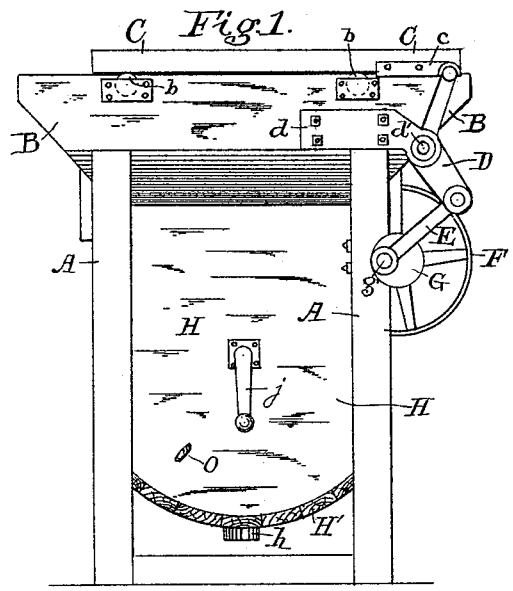
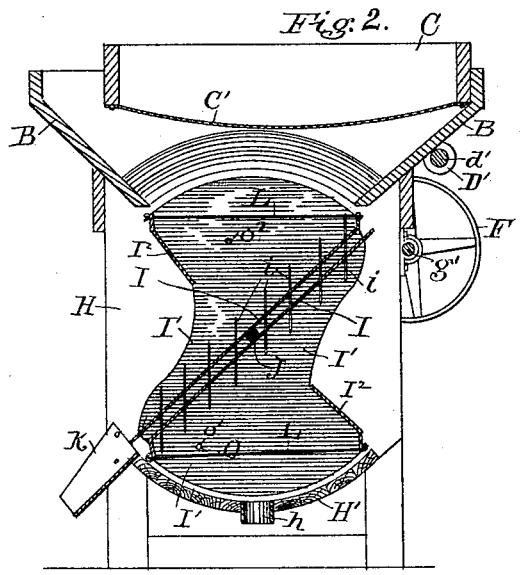
Witnesses:
Inventors:
Richard O. Conant and
Henry R. Stickney
by S. W. Bates Their atty.

(No Model.) 2 Sheets—Sheet 2.
R. O. CONANT & H. R. STICKNEY.
MACHINE FOR SILKING CORN.
No. 389,442. Patented Sept. 11, 1888.
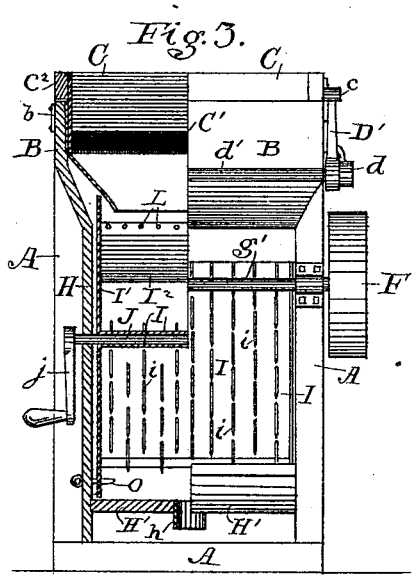
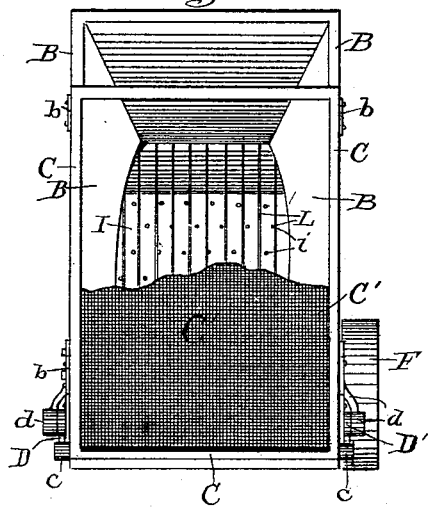

United States Patent Office.

RICHARD O. CONANT AND HENRY R. STICKNEY, OF PORTLAND, MAINE.

MACHINE FOR SILKING CORN.

SPECIFICATION forming part of Letters Patent No. 389,442, dated September 11, 1888.

Application filed September 7, 1887. Serial No. 249,046. (No model.)

*To all whom it may concern:*

Be it known that we, RICHARD O. CONANT and HENRY R. STICKNEY, citizens of the United States, residing at Portland, in the county of Cumberland and State of Maine, have invented certain new and useful Improvements in Machines for Silking Corn; and we do hereby declare the following to be a full, clear, and exact description of the invention, such as will enable others skilled in the art to which it appertains to make and use the same.

Our invention relates to machines for removing the silk from green corn previous to the operation of canning. Hitherto this has been commonly done by hand or by the use of devices which were partially automatic in their operation.

The most common mechanical appliance hitherto in use has been a permanently-fixed inclined diaphragm having pins inserted in its upper surface, the corn being dropped on this surface after passing through a sieve working over a hopper, the sieve being operated by hand. As the corn passed down the inclined surface the silk was caught and held on the projecting pins. The difficulty with this machine and others of a similar nature was that there was no way of quickly and easily clearing the silk from the pins when the latter become clogged, and the use of hand-labor for vibrating the sieve was also objectionable.

Machines have also been constructed wherein the inclined surface spoken of above has been made in removable sections; but these sections in order to be cleaned had to be taken from the machine and cleaned, thus necessitating the stopping of the machine. Other machines have been made with a moving band or apron passing over pulleys and provided with pins, the corn being fed to such apron through slots in the bottom of the hopper; but in this device no reciprocating sieve has been used, and the flexible material of which the apron was composed was not adapted for the work.

It was to remedy these difficulties that our present invention was particularly devised.

The invention consists of an inclined diaphragm having pins projecting at suitable intervals from its upper and under surfaces, this diaphragm being pivoted or otherwise secured to the machine in such a manner that it can be reversed, bringing the upper surface underneath, where it can be readily cleaned.

It further consists of two sets of auxiliary wires which are stretched horizontally above and below said diaphragm and are made to reverse with it, and in the use of a hopper above said table having a reciprocating or rocking sieve vibrated by suitable mechanism.

We have illustrated our invention by the use of the accompanying drawings, in which—

Figure 1 represents a side view of our machine. Fig. 2 represents a central longitudinal section. Fig. 3 represents a half end view and half transverse section, and Fig. 4 represents a plan or top view with a portion of the sieve cut away.

A is the frame-work of the machine, and at the top of the frame-work is the hopper B. Fitting in the open top of the hopper B is the sieve C, having sides $c^2$, which rest on the antifriction rollers $b$, pivoted in the sides of the hopper. The sieve C is somewhat shorter than the hopper, so that it can travel back and forth with a reciprocating motion. The bottom of the sieve is formed of the wire-netting C', which is depressed at its central portion, forming a curve. An eccentric, G, having a crank-pin, $g$, is attached to the end of the shaft $g'$, and on the other end of the shaft is the driving-pulley F. A link, E, is pivoted at one end to the crank-pin $g$ and at the other end to the lower end of the bent lever D, which is centrally pivoted to the bearing $d$ by the shaft $d'$. The upper end of the bent lever D plays in the yoke $c$, secured to the side of the sieve C. The shaft $d'$ extends across the machine, and has on its other end a single arm, D', identical with the upper part of the bent lever D, which arm plays in a similar yoke, $c$, secured to the other side of the sieve.

The inclined diaphragm I is constructed, preferably, of two parallel plates of galvanized iron, having pins $i$ passing through them and projecting from each side. The lateral edges of the diaphragm I are secured to the side pieces, I', and extending across from one side piece to the other are the two inclined shelves $I^2$, one above and the other below the diaphragm I. Wires L are stretched horizontally across from the edge of the shelf $I^2$ to the edge of the diaphragm. When the diaphragm I is in position, one of the shelves I² forms a continuation of the inclined side of the hopper whereby the corn is directed to the diaphragm. A shaft, J, passes centrally between the two plates of the diaphragm I and pivots them to the sides H of the machine. On one end of the shaft J is the crank j, by which the diaphragm I and its adjacent parts are rotated or reversed. A curved bottom, H', having a drip-pipe, h, leading from its lowest part, extends across the machine underneath the diaphragm I, and a spout, K, is attached to the frame-work of the machine in such a manner as to catch the corn as it falls from the lower edge of the diaphragm. A pin, O, passes through a hole in the side of the machine, and a corresponding hole, O', is formed in the side piece, I', whereby the diaphragm is prevented from rotating and held in place. When the diaphragm is reversed, as hereinafter described, the pin O is withdrawn and inserted in a corresponding hole, O², in the other end of the side piece, I'.

My device is operated as follows, viz: The corn is placed in the sieve C, which is vibrated or shaken by the rotation of the eccentric G, which causes the lever D to oscillate, this oscillation being imparted to the sieve by means of the yoke c. As the corn falls through the meshes of the sieve it comes in contact with the wires L, on which much of the silk catches and hangs, the remainder falling on the inclined diaphragm I. As the corn slides and rolls down the diaphragm I the silk catches on the pins i, the corn passing off at the spout K. When the pins i become clogged and it is desired to clean them, the pin O is withdrawn and the crank j turned, reversing the diaphragm I, the pin O being again inserted to hold it in place. A stream of water is now directed on the under side of the diaphragm I to clear the silk from the pins, from which it very readily drops; or any other means may be employed for this purpose.

It is obvious that this operation can be performed while the machine is in full motion, thus preventing the necessity of stopping it for cleaning, as in all machines hitherto used. The under side of the diaphragm, being entirely separated from the working parts of the machine, is easily accessible for cleaning or repairs. The auxiliary wires L are not essential to the successful working of the machine; but I consider their use an advantage.

The sieve can be removed by simply lifting it so as to disengage the ends of the levers D and D'.

The curved form of the bottom renders the operation of the sieve more efficient, since its horizontal motion has a tendency to force the corn through the meshes of the wire screen. This screen is not necessarily formed on a curve, for if it is formed in any manner so as to be inclined to the line of motion the same effect is produced—that is, the sliding of the sieve has a tendency to force the corn through the meshes instead of heaping it up in the middle of the sieve.

The construction of the diaphragm I of parallel plates united by means of pins passing entirely through gives a very strong and durable structure to it, and enables me to use galvanized sheet-iron in its construction—a material which is particularly adapted for this purpose. The use of these parallel plates also enables me to pass the pivoting-shaft centrally through the diaphragm without having it come in contact with the corn, on whichever side the diaphragm is turned.

We claim—

1. In a machine for silking corn, the combination of a hopper, a reciprocating sieve over said hopper, and an inclined diaphragm beneath said hopper having pins projecting from its upper and under faces, said diaphragm being pivoted to the side of the machine, substantially as and for the purpose set forth.

2. In a machine for silking corn, a hopper, a reciprocating sieve over said hopper, an inclined diaphragm beneath said hopper having pins projecting from its upper and under surfaces, and a shaft passing centrally through said diaphragm, whereby it is pivoted to the sides of the machine, substantially as described.

3. In a machine for silking corn, the combination of a hopper, an inclined diaphragm below said hopper, said diaphragm being composed of two parallel plates having pins extending through them and projecting from the outer face of each plate, side pieces connecting the edges of said plates, a shaft passing between said plates, whereby said diaphragm is centrally pivoted to the machine, and means for holding said diaphragm in position, substantially as described.

4. The combination of a stationary hopper, B, having converging ends, and the horizontally-reciprocating hopper, comprising inclosing-walls C and the sieve C', presenting a concave upper surface, substantially as set forth.

In testimony whereof we affix our signatures in presence of two witnesses.

RICHARD O. CONANT.
HENRY R. STICKNEY.

Witnesses:
S. W. BATES,
ROBERT A. DAVIS.